(12) United States Patent
Elias et al.

(10) Patent No.: US 11,009,949 B1
(45) Date of Patent: May 18, 2021

(54) SEGMENTED FORCE SENSORS FOR WEARABLE DEVICES

(71) Applicant: Apple Inc., Cupertino, CA (US)

(72) Inventors: John G. Elias, Townsend (DE); Ray L. Chang, Saratoga, CA (US); Moshe H. Malkin, Menlo Park, CA (US); Vivek Pant, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 16/057,623

(22) Filed: Aug. 7, 2018

Related U.S. Application Data

(60) Provisional application No. 62/542,732, filed on Aug. 8, 2017.

(51) Int. Cl.
*G06F 3/01* (2006.01)
*G06F 1/16* (2006.01)
*G06F 3/041* (2006.01)
*G06F 3/0488* (2013.01)
*G06F 3/044* (2006.01)

(52) U.S. Cl.
CPC .............. *G06F 3/014* (2013.01); *G06F 1/163* (2013.01); *G06F 3/044* (2013.01); *G06F 3/0414* (2013.01); *G06F 3/04883* (2013.01); *G06F 2203/04102* (2013.01)

(58) Field of Classification Search
CPC ........ G06F 3/014; G06F 3/044; G06F 3/0414; G06F 3/04883; G06F 1/163
USPC ........................................ 345/174, 173, 156
See application file for complete search history.

(56) References Cited

U.S. PATENT DOCUMENTS

| 7,479,949 | B2 | 1/2009 | Jobs et al. | |
| 8,467,133 | B2* | 6/2013 | Miller | G02B 27/017 |
| | | | | 353/28 |
| 9,588,341 | B2 | 3/2017 | Bar-Zeev et al. | |
| 2006/0248478 | A1* | 11/2006 | Liau | G06F 3/014 |
| | | | | 715/863 |
| 2009/0273573 | A1 | 11/2009 | Hotelling | |
| 2012/0001901 | A1 | 1/2012 | Park | |
| 2013/0088413 | A1 | 4/2013 | Raffle et al. | |
| 2014/0052026 | A1* | 2/2014 | Bishara | A61B 5/0053 |
| | | | | 600/587 |

(Continued)

OTHER PUBLICATIONS

Qiang Ye, et al, "Force-Sensing Glove System for Measurement of Hand Forces during Motorbike Riding", International Journal of Distributed Sensor Networks, vol. 2015, Article IDS 545643, 2015, p. 1-9.

(Continued)

*Primary Examiner* — Jimmy H Nguyen
(74) *Attorney, Agent, or Firm* — Robert C. Kowert; Kowert, Hood, Munyon, Rankin & Goetzel, P.C.

(57) ABSTRACT

A wearable electronic device comprises a multi-segment force sensor and a signal aggregator. The sensor comprises at least a first segment and a second segment connected to a flexible substrate material. A first portion of the substrate material (to which the first segment is attached) and a second portion of the substrate material (to which the second segment is attached) collectively wrap at least partially around a portion of an individual's body. The signal aggregator receives respective signals indicative of forces applied by an individual to the segments, and causes a representation of the respective signals to be transmitted to an application processing engine.

20 Claims, 11 Drawing Sheets

(56) References Cited

U.S. PATENT DOCUMENTS

2015/0003819 A1    1/2015  Ackerman et al.
2016/0169754 A1*   6/2016  Kowalewski ........... G01L 5/228
                                                73/862.046
2016/0305759 A1*  10/2016  Reese .................... G01B 7/30
2016/0327793 A1   11/2016  Chen et al.

OTHER PUBLICATIONS

Wikipedia, "Capacitive sensing", Retrieved from URL: https://en.wikipedia.org/wiki/Capacitive_sensing on Jun. 13, 2017, pp. 1-5.
Tu-Hoa Pham, et al, "Towards Force Sensing from Vision: Observing Hand-Object Interactions to Infer Manipulation Forces", Computer Vision Foundation, IEEE Xplore, 2015, pp. 1-10.
YouTube, "The Force Sensing Glove", Screen shot, Apr. 14, 2008, p. 1.
U.S. Appl. No. 15/965,539, filed Apr. 27, 2018, D. Amnon Silverstein.

* cited by examiner

1

SEGMENTED FORCE SENSORS FOR WEARABLE DEVICES

This application claims benefit of priority to U.S. Provisional Application Ser. No. 62/542,732, entitled "SEGMENTED FORCE SENSORS FOR WEARABLE DEVICES," filed Aug. 8, 2017, and which is incorporated herein by reference in its entirety.

BACKGROUND

Technical Field

This disclosure relates generally to systems and algorithms for sensing and analysis of forces applied using wearable electronic devices.

Description of the Related Art

Mixed-reality applications, in which the view made visible to a participating individual or user may comprise real-world objects superimposed with virtual objects or supplementary information regarding the real-world objects, are an increasing focus of research and development. Many aspects of mixed-reality applications rely on video data captured using a combination of sensors—for example, data frames representing the scene visible to a user may be captured, together with the direction of the gaze of the individual, and the data frames may be analyzed and augmented with virtual objects before being re-displayed to the user. Vision and hearing-related sensor data for mixed-reality applications can be captured effectively using head-mounted devices and the like. However, data associated with other senses such as touch may also be relevant for at least some types of mixed-reality applications, and it may not be possible to detect such data using video/audio sensors. Capturing and interpreting potentially subtle aspects of touch interactions (e.g., the combination of forces of a grip applied to a real tool or a virtual tool superimposed over a real object, or the relative timing of changes of applied forces) associated with various types of applications remains a challenging technical problem.

SUMMARY OF EMBODIMENTS

Various embodiments of methods and apparatus for detecting and analyzing forces applied by individuals using hand-wearable devices (such as gloves) and other types of wearable devices equipped with multi-segment force sensors are described. According to some embodiments, a wearable electronic device may comprise one or more multi-segment force sensors as well as at least one signal aggregator. A given multi-segment force sensor may comprise a plurality of sensor segments connected to a flexible substrate material in various embodiments. The substrate material may be wrapped at least partially around a portion of the body of an individual. For example, in the case of a hand-wearable device, a first portion of the substrate material and a second portion of the substrate material may collectively be wrapped at least partially around a particular finger of the individual, with a first sensor segment attached to the first portion, and a second sensor segment attached to the first portion. In at least some embodiments, respective multi-segment force sensors may be used for one or more digits (fingers or toes) of a body extremity (a hand or a foot). Individual ones of the segments of a hand-wearable device may be capable of providing respective distinct indications of the magnitudes of forces applied by the individual using the different parts of a finger adjacent to the segments (e.g., when the individual presses a finger against a hard or soft surface, rolls or slides a finger along a surface, or holds an object with a combination of fingers/thumbs). The sensor segments or elements may be comprised of thin flexible materials in various embodiments. For example, flexible circuitry used for the sense and drive electrodes may in turn be attached to a flexible substrate material (with tactile properties similar to those of cloth or leather), enabling a given multi-segment sensor to be wrapped at least partially around a digit, and providing a comfortable and natural feel to the wearer of the sensor-equipped device in at least some embodiments.

The signal aggregator may receive respective signals indicative of applied forces applied by an individual to the segments in some embodiments, and cause a representation of the respective signals to be transmitted to an application processing engine. The application processing engine may, in various embodiments, analyze the data provided by the signal aggregator (in some cases in combination with other data provided by other signal aggregators of other multi-segment force sensors and/or sensor data obtained from other devices), and initiate one or more application-dependent operations in response. For example, in some embodiments, the multi-segment sensors and the application processing engine may be used collectively for a mixed-reality application, and the data received from a sensor-equipped hand-wearable device may be interpreted as a command or directive to be implemented. In some cases the operations initiated by the processing engine may result in a modification to a real and/or virtual environment of the individual, which may in turn lead to the individual modifying the forces applied using the wearable device, leading to additional iterations of capturing and analyzing force data followed by sensory feedback to the individual.

In at least some embodiments, mutual capacitance sensors may be used as force sensors, e.g., with a gel-based dielectric layer positioned between the sense and drive electrode elements. The flexible substrate material used for a given multi-segment sensor (e.g., for a particular finger), when in an unfolded conformation, may comprise a fold line which separates the region of the substrate on which the sense electrode elements are attached from the region on which the drive electrode element(s) are attached. In actual use, the substrate material may be folded along the fold line in various embodiments, enabling the dielectric layer to be positioned or "sandwiched" between the sense and drive electrode elements. In other embodiments, at least some force sensors which do not rely on mutual capacitance may be used instead of or in addition to mutual capacitance sensors, such as strain gauges, force sensitive resistors, other displacement-based sensors such as inductive sensors and so on.

In some embodiments, the wearable electronic device may comprise one or more inertial measurement units (IMUs), which cause indications of changes in position or orientation of the sensors (and/or other components of the wearable device) to be transmitted to the application processing engine and/or other destinations. The combination of positional/movement information and the force information from a plurality of sensor segments of various sensors may be used to interpret a rich set of touch-based interactions in various embodiments, e.g., analogous to multi-touch interactions made using a touch-sensitive screen of a smart phone or tablet device. The respective surface areas and/or shapes of the sensor segments may differ from one another within a given multi-segment sensor and/or across different multi-segment sensors in various embodiments. Different sensors may comprise different numbers of segments in some embodiments.

According to one embodiment, a system may comprise a sensor-equipped wearable device and a processing engine comprising one or more processors and a memory. The memory may comprise program instructions that when executed cause the processors to implement a method comprising obtaining, from a first multi-segment sensor of a first finger of the wearable device, an indication of a first distribution of force applied by an individual during a particular time interval. The first multi-segment sensor may, for example, include a first segment positioned at the tip of the finger, and a second segment positioned along a palm-side surface of the finger. The method may also include obtaining, from a second multi-segment sensor of a second finger of the wearable device, an indication of a second distribution of force applied by an individual during the particular time interval. Based at least in part on an analysis of the first and second distributions of force, one or more operations which implement a detected directive of the individual may be initiated. The analysis of the distributions of forces may comprise, for example, detecting a multi-touch gesture made by the individual. In some embodiments, detected forces may result from contact with one or more surfaces onto which a virtual object is projected. The virtual object may comprise, for example, a virtual keyboard, a virtual trackpad, a virtual mouse or a virtual button.

According to some embodiments, a method may comprise obtaining, from a first multi-segment sensor of a first finger of a wearable device, an indication of a first distribution of force applied by an individual during a particular time interval. The first multi-segment sensor may comprise at least a first segment positioned at a tip of the first finger and a second segment positioned along a side of the first finger. The method may include determining, based at least in part on an analysis of the first distribution of force, and based at least in part on a position of the first finger, a directive to be implemented on behalf of the individual. An operation implementing the directive may be initiated. The first distribution of force may be caused as a result of contact between the first finger and a surface (which may be a hard surface or a flexible surface such as a fleshy part of an arm, leg, or face).

In some embodiments, in addition to obtaining and analyzing the force-related information, a method may comprise obtaining, from one or more optical sensors, a data set representing at least a portion of a visible environment of the individual. The directive that is to be implemented may be based on a combination of the data set related to the visible environment and force-related data obtained from one or more of the multi-segment sensors. In some cases, the portion of the visible environment captured by the optical sensors may not encompass a view of at least part of the wearable device comprising the multi-segment force sensors.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
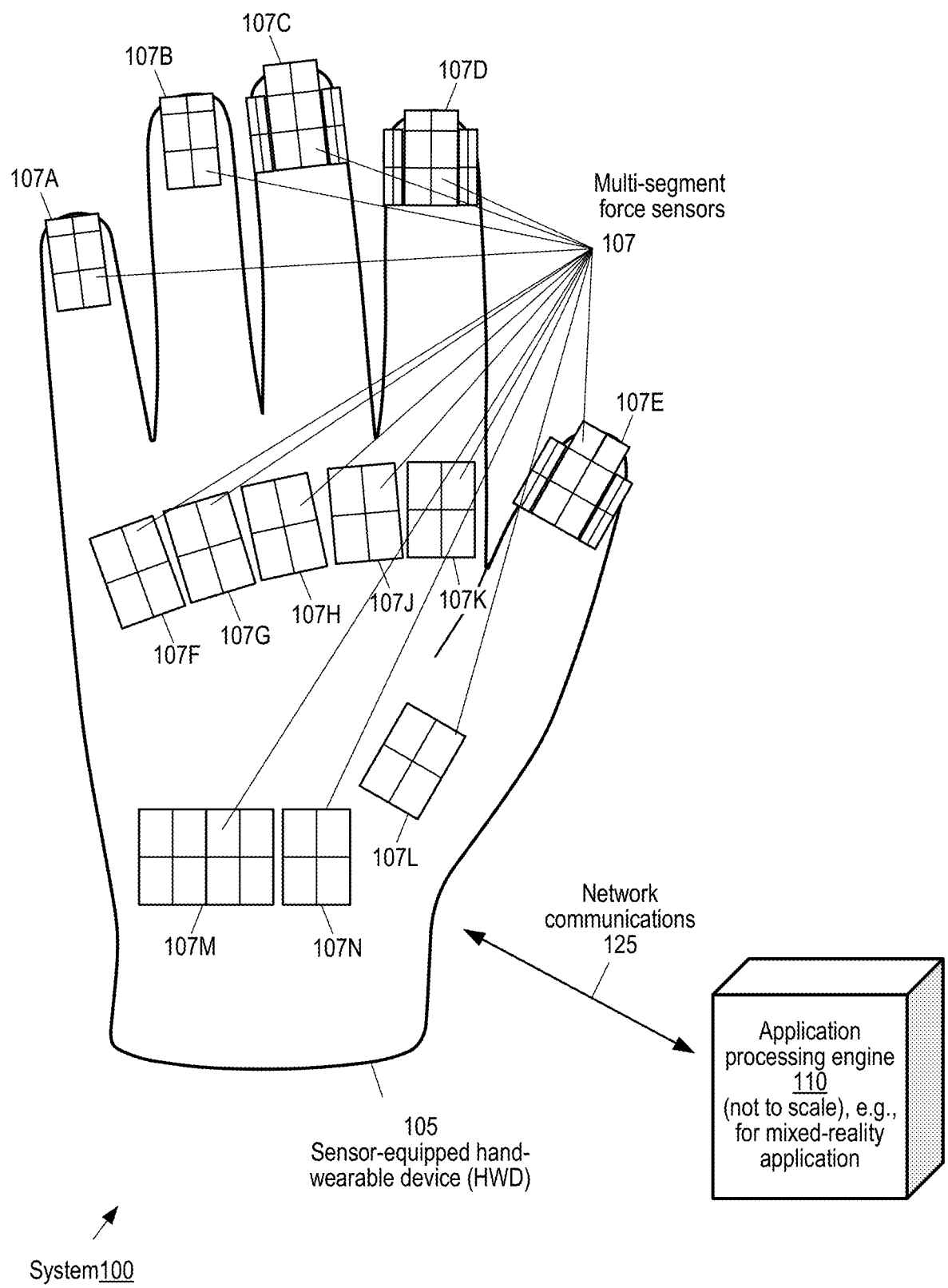
FIG. 1 illustrates a hand-wearable device equipped with a plurality of multi-segment force sensors whose output may be analyzed at an application processing engine, according to at least some embodiments.

FIG. 1 illustrates a hand-wearable device equipped with a plurality of multi-segment force sensors whose output may be analyzed at an application processing engine, according to at least some embodiments. In the following description, the acronym HWD may be used to refer to hand-wearable devices, of which gloves or similar accessories may be considered examples. As shown, system 100 may comprise at least one sensor-equipped HWD 105, and an application processing engine 110 configured for network communications 125 with the HWD 105. Sensor-equipped HWD 105 represents one example of a wearable electronic device comprising multi-segment force sensors which may be utilized for a variety of applications, such as mixed-reality applications; in other embodiments, for example, socks, stockings, wristbands, belts and the like may be enhanced using similar multi-segment force sensors to those shown in FIG. 1. The term "body extremity" may be used herein to refer collectively to hands and feet for which at least some of the sensor-equipped wearable devices may be designed, and the term "digit" may be used to refer collectively to fingers, thumbs and toes for which respective multi-segment force sensors may be incorporated in the wearable devices in various embodiments.

In the depicted embodiment, a respective multi-segment force sensor 107 may be attached to each of the five digits (four fingers and thumb) of the HWD 105, e.g., in a region close to the tip of the finger or thumb. For example, multi-segment force sensors 107A-107D may be attached near the tips of the fingers of the HWD, while multi-segment force sensor 107E may be attached near the tip of the thumb of the HWD. In addition, in some embodiments, other multi-segment force sensors such as 107F, 107G, 107H, 107J, 107K, 107L and/or 107M may be attached at other positions on the HWD. The underlying wearable flexible substrate material to which the sensor segments are attached may have similar tactile properties to (or be comprised of) materials typically used for HWDs, such as textile/cloth or leather in various embodiments. In at least some embodiments, the sensors themselves may also be constructed of flexible materials (e.g., the materials used for sense and drive electrode elements and the electrolyte material may be flexible or bendable). The individual segments of a given multi-segment force sensor, shown schematically as rectangular shapes in FIG. 1, may each comprise a respective sense element (as well as a portion of a dielectric material, and a drive element which may be shared among the sense elements) as discussed below in further detail. The terms "segment" and "element" may be used synonymously herein with respect to the multiple subcomponents of force sensors capable of generating respective indications of applied force in various embodiments.

In some embodiments, multi-segment force sensors need not necessarily be located at all the different positions shown in FIG. 1. For example, in some embodiments, respective sensors may not be attached at non-digit positions (positions other than the fingers and thumb), or sensors may not necessarily be attached to all the digits. In at least one embodiment, one or more properties of respective multi-segment sensors located at various positions of HWD 105 may differ—some sensors may have a different number of segments than others, some sensors may have larger/smaller segments than others, some sensors may be wrapped around fingers in their baseline configuration while others may not, and so on. The shapes and sizes of at least some individual segments of a multi-segment sensor may differ from one another in some embodiments. In at least one embodiment, one or more of the sensor segments may not be rectangular or polygonal—e.g., oval, circular or irregularly-shaped segments may be used.

In various embodiments, at least some of the multi-segment force sensors 107 may be constructed using thin flexible materials as mentioned above; details of the components of the sensors and the manner in which sensors are folded in some embodiments are provided below. As indicated by its name, a given multi-segment force sensor 107 may comprise a plurality of sense element segments. In some embodiments, each of the segments may provide an independent signal of the force being applied, or the pressure exerted, when the segment is touched or pressed against some other surface. In various embodiments, a force sensor may comprise one or more mutual capacitance sensor devices, e.g., with a flexible gel-based dielectric layer between the sense and drive electrodes of a given mutual capacitance sensor. In the case of multi-segment force sensors such as 107C or 107D, which are located near the tips of the corresponding fingers, respective sets of one or more segments may be positioned near the tips of the fingers, on the palm-side or ventral surfaces of the fingers, and/or at the sides of the fingers, so that indications of the spatial and temporal distribution of applied forces with respect to various parts of the finger can be obtained. The segments of a force sensor may be attached to a thin and flexible substrate material in some embodiments; as a result, at least a portion of the multi-segment force sensor may be wrapped partially or fully around the corresponding digit (or some other portion of the body of the individual wearing the device). In some embodiments, at least some force sensors which do not comprise capacitors (e.g., strain gauges, force sensitive resistors, other displacement-based sensors such as inductive sensors and so on) may be employed. In some embodiments, a wearable electronic device with multi-segment sensors attached to a flexible substrate material may be worn on, or wrapped at least partly around, other parts of the body than a hand or a foot. Different segments of a given multi-segment sensor may be attached to respective portions of the flexible substrate material in such embodiments such that the individual segments can sense respective forces being applied by different parts of the portion of the body for which the sensor is being used.

In at least some embodiments, as shown in detail view 144, a multi-segment force sensor 107 such as 107E may comprise a signal aggregator 146 which receives respective signals indicative of applied forces from individual ones of the segments 145 attached to a flexible substrate material 147. The signal aggregator 146 may transmit a representation of the signals to an application processing engine 110 using a wireless or wired network path as indicated by the arrow labeled network communications 125. (It is noted that the application processing engine 110 is not shown to scale with respect to HWD 105 of FIG. 1—for example, in some embodiments, the application processing engine may be implemented at a desktop or server computer system which may be much larger than a typical HWD such as a glove, while in other embodiments the application processing engine may be implemented at an embedded computing device or chip set much smaller than a typical HWD.) In some embodiments in which capacitive force sensors are used, the signal aggregator may in effect convert the changes in capacitance detected at the sensor segments into a digital signal representing applied forces; in other embodiments, the capacitance changes may be converted into force metrics at the application processing engine. The application processing engine 110 may receive similar signal representations from respective signal aggregators 146 at individual ones of the multi-segment sensors in various embodiments, thereby obtaining the distribution of applied forces at various parts of the HWD 105. In one embodiment, an additional intermediary device (which may be referred to as a control and communication unit) attached to the HWD 105 may gather data from the signal aggregators of the individual multi-segment sensors and send a representation of the combination of the data received from various parts of the HWD to the application processing engine. In some embodiments, a given signal aggregator may generate a combined representation of the signals from the individual sensor segments prior to transmitting the representation to the application processing engine. In other embodiments, respective representations of the signals received from individual segments may be sent to the application processing engine.

A variety of applications which involve analysis of the transmitted force information may be executed at least in part at the application processing engine 110 in the depicted embodiment, such as various mixed-reality applications, augmented reality applications, virtual reality applications and the like. In at least some embodiments, in addition to receiving and analyzing data transmitted from the sensor-equipped HWD 105, the application processing engine 110 may serve as the destination for a variety of signals transmitted from other sensor-equipped devices, such as a head-mounted device of a mixed-reality application. In some cases, at least a portion of the data received at the processing engine 110 from the sensor-equipped HWD 105 and/or other sensor-equipped devices may be interpreted or detected as a directive or command issued by the individual wearing the HWD 105, and one or more operations to implement the directive or command may be issued by the processing engine. For example, in some embodiments, the distribution of forces applied using the HWD, or individual ones of the forces applied using the HWD, may be interpreted as respective actions performed with respect to a virtual keyboard (such as typing actions), a virtual joystick, mouse, etc., with the actions in turn being interpreted as commands or directives. In at least some embodiments, the application processing engine may transmit its own output signals to the HWD 105, e.g., to indicate physical feedback by stiffening portions of the HWD, bending portions of the HWD, etc.

In some embodiments, the sensor-equipped HWD 105 may also comprise one or more inertial measurement units (IMUs) configured to provide positional or motion-related information about the portion of the HWD to which they are attached. In one embodiment, one or more such IMUs may be incorporated within or attached to individual multi-segment sensors 107. In such embodiments, an indication of the change of position, orientation, or speed of individual digits relative to one another, detected using the IMU(s), may also be provided to the application processing engine 110. When the individual wearing the HWD spreads their fingers apart, or holds an object such as a pencil between two fingers, relative positional information indicating such actions may be generated with the help of the IMUs and processed in the context of the application. The combination of force information and positional information may be analyzed at the application processing engine 110 as a detected multi-touch gesture, e.g., similar to a gesture to decrease or increase the size of a displayed photograph on a touch-sensitive screen. It is noted that in at least some embodiments, the forces being measured using the multi-segment sensors need not necessarily be caused by pressing the sensor segments against a hard surface; instead, the sensors may be sensitive enough to detect changes in pressure experienced when a flexible surface (such as the skin on the arm or leg of the individual wearing the HWD) is contacted. In some embodiments, at least some of the measured forces may result from the individual's touching or contacting a virtual object projected onto a physical surface (such as a virtual keyboard, trackpad or button projected onto the surface of a table or desk).

The rate at which information about applied forces is transmitted to the application processing engine 110 may differ in different embodiments. In some embodiments, depending on the specifics of the application, the representations of the applied forces may be transmitted once every $\frac{1}{30}^{th}$ or $\frac{1}{60}^{th}$ of a second, for example. In one embodiment, the transfer rate may be a configurable parameter. A given communication or transfer over the network may represent the collected force information gathered since the previous communication or transfer in some embodiments—that is, the data transmitted may represent force applied over some time interval in such embodiments, and may not necessarily be restricted to an instantaneous measurement of applied force. In various embodiments, the application processing engine 110 may be able to obtain both a spatial and a temporal distribution of applied forces as detected by the multi-segment sensors. In some embodiments, the individual segments of the sensors may be referred to as sensor pixels, and a multi-segment force sensor may be referred to as a pixelated force sensor. In some embodiments, the components of the multi-segment sensor may be implemented using smart fabrics or smart cloth components—that is, the electronics elements may be embedded within, rather than attached to, the flexible material used for the HWD or other wearable device. In some embodiments, at least a portion of processing operations for an application which uses the force data collected at a sensor-equipped HWD 105 may be performed at the HWD itself—e.g., communication to a remote application processing engine 110 may not be required for some types of applications.

Figure 2:
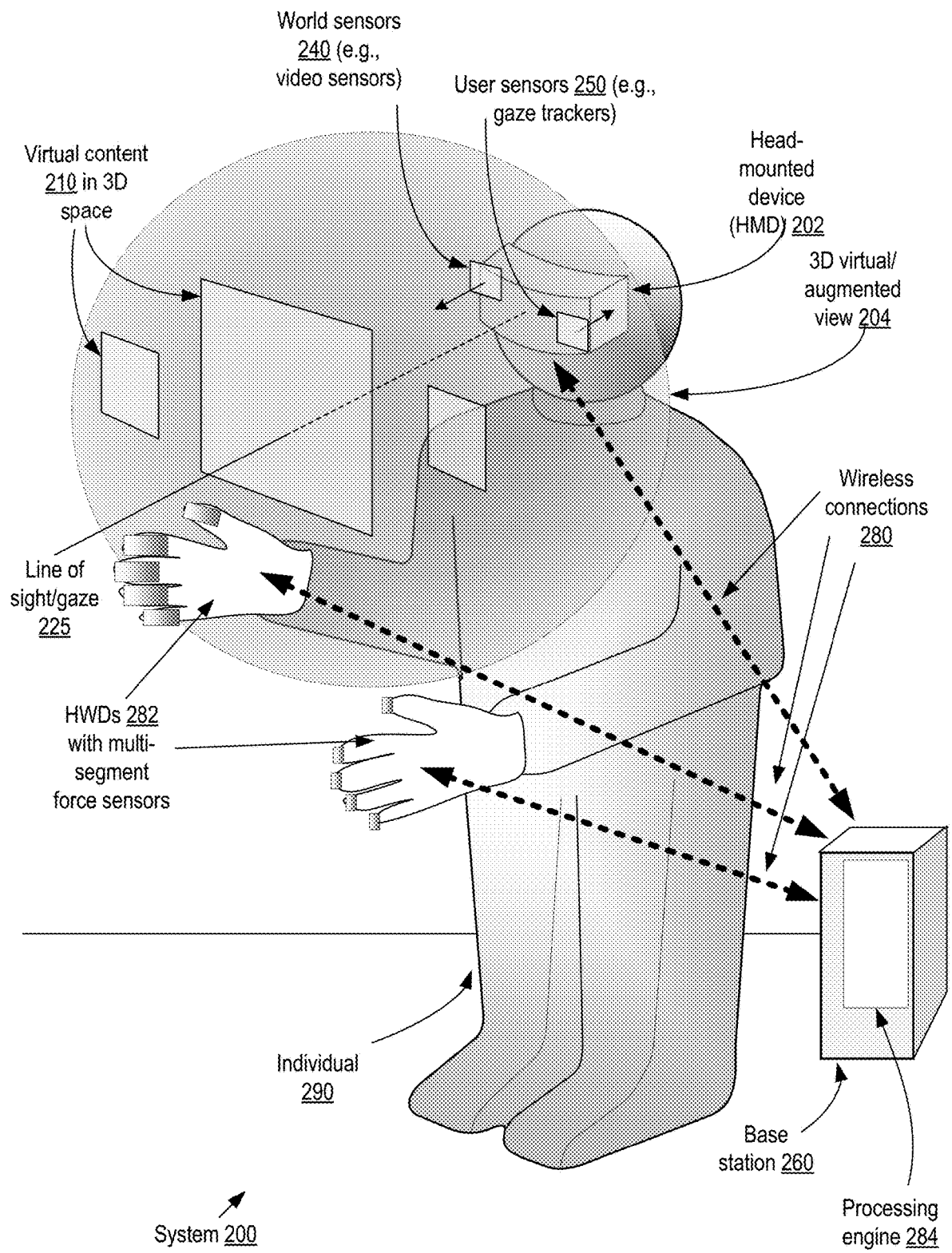
FIG. 2 illustrates an example system environment in which signals captured from a head mounted device and a pair of hand-wearable devices equipped with multi-segment force sensors may be processed for a mixed-reality application, according to at least some embodiments.

FIG. 2 illustrates an example system environment in which signals captured from a head mounted device and a pair of hand-wearable devices equipped with multi-segment force sensors may be processed for a mixed-reality application, according to at least some embodiments. As shown, system 200 may comprise a number of wearable electronic devices used collectively for a mixed-reality application by an individual 290, including a head mounted device (HMD) 202 and HWDs 282 with multi-segment force sensors similar to those discussed above in the context of FIG. 1. It is noted that although a mixed reality application represents one example of a type of scenario in which multi-segment force sensors may be employed, similar sensors may be used with equal success for a variety of other applications (such as for improving the balance or coordination of robots or humans) in different embodiments; that is, a mixed reality system is not a requirement for the use of multi-segmented force sensors.

In various embodiments, a mixed-reality (MR) system may combine computer generated information (referred to as virtual content) with real world images or a real world view to augment, or add content to, an individual's view of the world, or alternatively may combine representations of real world objects with views of a computer generated three-dimensional (3D) virtual world. A head mounted device HMD 202 used for the MR application may for example comprise a headset, helmet, goggles, or glasses that may be worn by an individual or user 190. A base station 260 may comprise a processing engine 284 configured to analyze force distribution information obtained from HWDs 282, video data received from HMD 202, and render mixed reality frames including virtual content 210 for display by the HMD 202 in the depicted embodiment. In some embodiments, the processing engine 284 may also provide feedback to the individual via the HWDs 282—e.g., by causing the HWDs to stiffen or change shape based on the analysis of the force signals received from the HWDs. HMD 202, base station 260 and/or HWDs 282 may each include wireless communications technology that allows data to be exchanged via wireless connections 280.

In the depicted embodiment, video data representing at least some portions of an environment (which may comprise both real and virtual objects) of the individual 290 may be captured using world sensors 240 (which may include, for example, image sensors, video cameras, and the like). One or more user sensors 250, such as gaze tracking sensors, may be employed to monitor various aspects of the behavior and movement of individual 290; for example, the line of sight or gaze 225 of the individual may be tracked using sensors directed at the individual's eyes. In some embodiments, the video data captured using sensors 240 and/or 250 may be pre-processed (e.g., using filtering or compression algorithms to reduce bandwidth usage) before it is transmitted to the base station. Similarly, in at least one embodiment, the force signal representations captured using HWDs 282 may be pre-processed using filtering or compression prior to being transmitted to the processing engine.

In at least some embodiments, the position of the individual 290's hands may not necessarily be detectable using the world sensors 240, at least during some time intervals. Furthermore, even if the positions of the hands (or HWDs 282) are detected by the world sensors, the visual information captured by the world sensors may not include indications of the magnitudes of applied forces, or the specific points in time at which the applied force from a particular finger of the HWD was increased/decreased etc. As such, the force-related information captured using the multi-segment sensors of HWDs 282 may represent an orthogonal and at least partially independent set of sensor data to that captured via optical sensors such as video cameras and the like in the depicted embodiment. The combination of the video data captured using cameras and the like with the force data captured using the HWDs 282 may enable a richer set of functionality to be implemented in various embodiments than if just the HMD-based sensors were used.

The processing engine 284 at the base station 260 may, for example, analyze the received video and/or force-related data and interpret it in various ways (e.g., as touch-based commands/directives) depending on the specifics of the application being implemented. In some embodiments, at least some of the received data may be used to augment or enhance the representation of the individual's environment. A representation of the modified version of the environment may be sent back to the HMD 102 as augmented renderings for display to the individual, and/or to HWDs 282 as augmented haptic feedback.

In some embodiments, world sensors 240 may collect additional information about the user 290's environment (e.g., depth information, lighting information, etc.) in addition to video. Similarly, in some embodiments, user sensors 250 may collect additional information about the individual 290, such as expressions, face gestures, head movements, etc. A 3D virtual view 204 may comprise a three-dimensional (3D) space including virtual content 210 at different depths that individual 290 sees when using the mixed reality system of FIG. 2. In some embodiments, in the 3D virtual view 204, the virtual content 210 may be overlaid on or composited in a view of the individual 290's environment with respect to the user's current line of sight that is provided by the HMD 202. HMD 202 may implement any of various types of virtual reality projection technologies in different embodiments. For example, HMD 202 may implement a near-eye VR technique that displays left and right images on screens in front of the individual 290's eyes that are viewed by a subject, such as techniques using DLP (digital light processing), LCD (liquid crystal display) and LCoS (liquid crystal on silicon) technology VR systems. As another example, HMD 202 may comprise a direct retinal projector system that scans left and right images, pixel by pixel, to the subject's eyes. To scan the images, left and right projectors may generate beams that are directed to left and right reflective components (e.g., ellipsoid mirrors) located in front of the individual 290's eyes; the reflective components may reflect the beams to the eyes. To create a three-dimensional (3D) effect, virtual content 210 at different depths or distances in the 3D virtual view 204 may be shifted left or right in the two images as a function of the triangulation of distance, with nearer objects shifted more than more distant objects.

While not shown in FIG. 2, in some embodiments a mixed reality system may include one or more other components. For example, the system may include a cursor control device (e.g., mouse or trackpad) for moving a virtual cursor in the 3D virtual view 204 to interact with virtual content 210. Other types of virtual devices such as virtual keyboards, buttons, knobs and the like may be included in the 3D view 204 in some embodiments, e.g., by projecting them onto physical surfaces such as desks. If and when individual 290 uses HWDs 282 to interact with such projected virtual objects, e.g., by pressing or touching the physical surfaces on which the objects are projected, indications of the forces applied using the HWDs may be transmitted to the base station and interpreted as operations (such as typing on various keys of the virtual keyboard) performed on the projected virtual objects in some embodiments. The operations performed on the virtual objects may in turn be interpreted as commands or directives at the processing engine in some embodiments (e.g., a sequence of typed keys may represent a command to display a typed word or an object indicated by the typed keys, or a command to change part of the virtual and/or physical environment in some way). While FIG. 2 shows a single individual 290 with an HMD 202 and a pair of HWDs 282, in some embodiments a mixed reality environment may support multiple HMDs 202 and HWD pairs 282 communicating with the base station 260 at the same time to enable multiple individuals 290 to use the system at the same time in a co-located environment.

Figure 3:
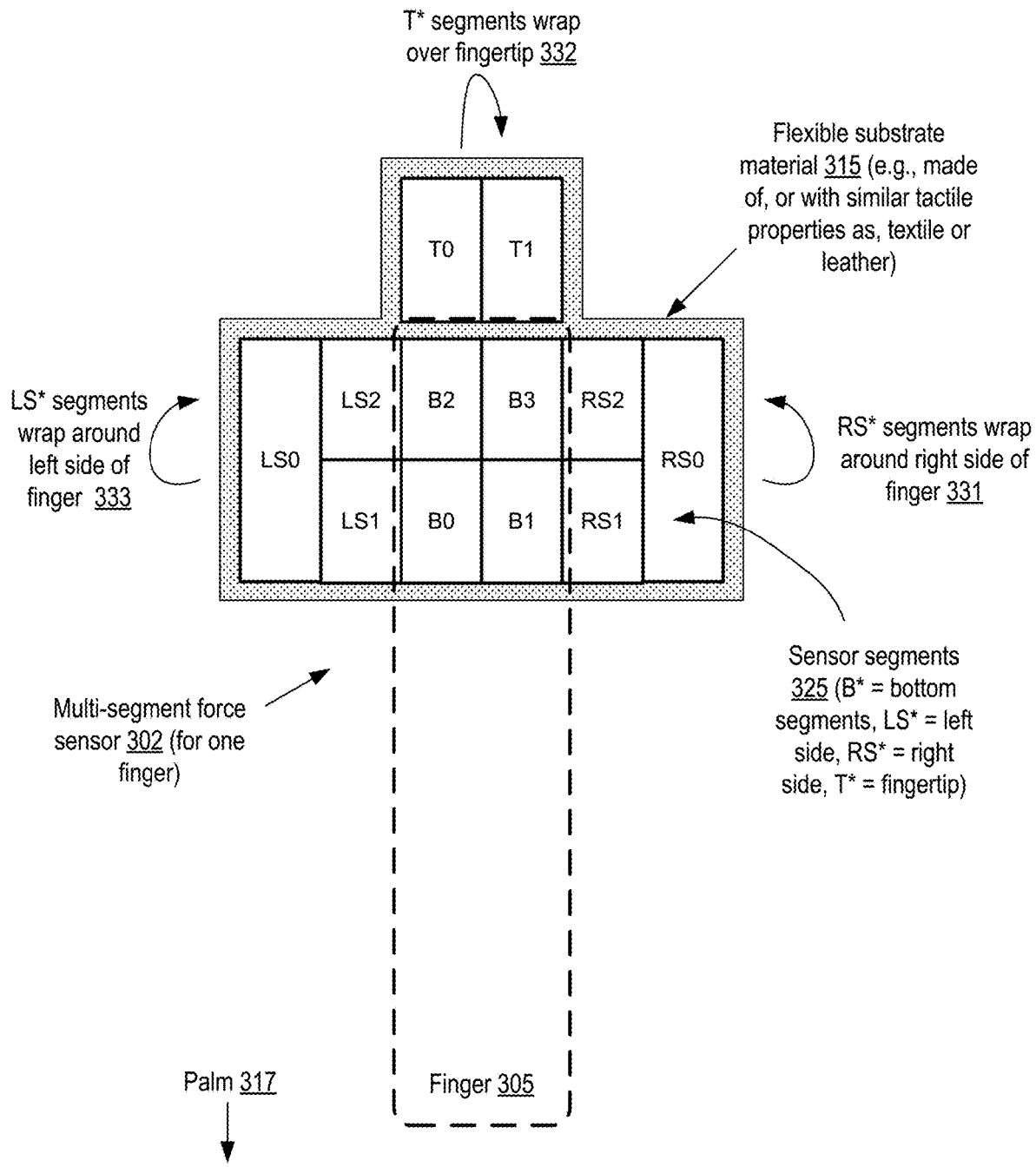
FIG. 3 illustrates an example set of segments of a force sensor for a finger, according to at least some embodiments.

FIG. 3 illustrates an example set of segments of a force sensor for a finger, according to at least some embodiments. In the example configuration depicted in FIG. 3, a total of twelve sensing segments may be used for sensor 302 deployed for a particular finger 305. A schematic representation of the twelve sensor segments in an unfolded conformation is shown in FIG. 3 to simplify the presentation, with the position of the finger 305 and the palm 315 as indicated (towards the bottom of FIG. 3). In practice, as discussed below in further detail with respect to various figures including FIG. 4 and FIG. 5, the sensor 302 would typically be deployed in a folded conformation and partially folded around the finger 305, which would enable the pressure applied by the individual wearing the sensor-equipped device to cause detectable variations in mutual capacitance.

In the example shown in FIG. 3, the segments 325 of the force sensor 302 are labeled according to their positions relative to the finger 305. For example, segments T0 and T1 (where the T stands for "tip" of the finger) may be wrapped partially over the fingertip in the deployed folded configuration, as indicated in label 332. Segments B0, B1, B2 and B3 (where B stands for the "bottom", ventral or palm-side portion of the finger) would collectively be positioned along the ventral surface of the finger 305. Segments LS0, LS1 and LS2 (where LS stands for "left side" of the finger when viewed from a direction in which the palm 317 is visible) may be wrapped over the top left part of the finger 305, as indicated by label 333. Segments RS0, RS1 and RS2 (where the RS stands for "right side") may be wrapped over the top right part of the finger, as indicated by the label 331. All the segments 325 may be attached to (or incorporated within) a flexible wraparound substrate material 315 in the depicted embodiment. Any of a number of materials may be employed for the substrate 315 in different embodiments, such as plastic or plastic-like materials, leather or leather-like materials, cloth/fabric of various kinds, and the like, thereby providing similar tactile experience as wearable materials that are not electronically enhanced.

Figure 4:
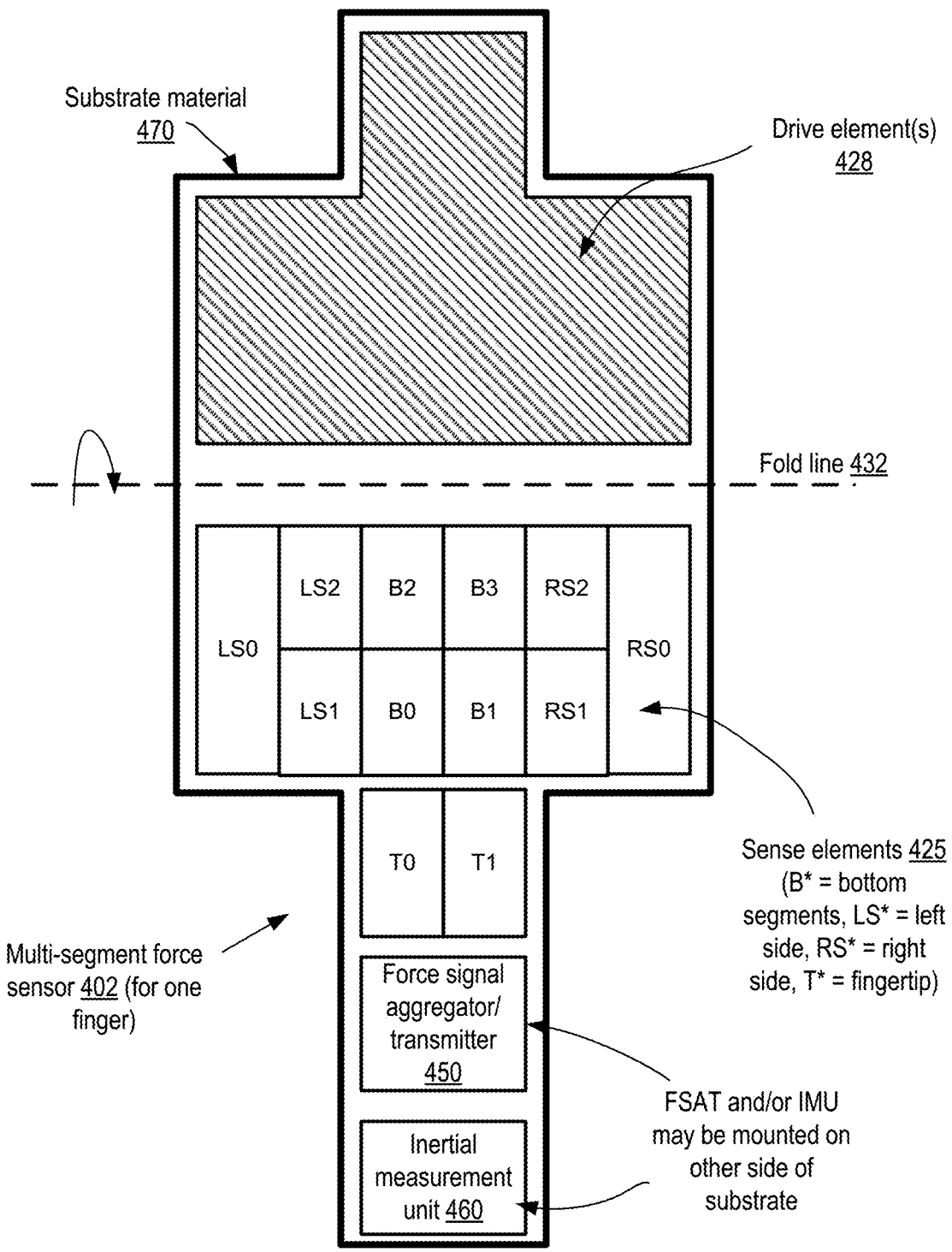
FIG. 4 illustrates an example positioning of drive and sense elements of a multi-segment force sensor, according to at least some embodiments.

FIG. 4 illustrates an example positioning of drive and sense elements of a multi-segment force sensor, according to at least some embodiments. As in the case of FIG. 3, the multi-segment force sensor 402 for a particular finger of an HWD is illustrated in the unfolded conformation in FIG. 4. The flexible substrate material 470 of the multi-segment force sensor 402 may be divided into two primary regions by a fold line 432 in the depicted embodiment. Prior to being attached to the HWD, in various embodiments, the substrate 470 may be folded along the fold line 432 as described below in the context of FIG. 5.

In the embodiment depicted in FIG. 4, in the unfolded conformation, one or more drive element(s) 428 of the sensor 402 may be positioned on one side of the fold line 432 while a plurality of sense segments or elements 425 may be positioned on the other side of the fold line 432. Twelve sense elements are shown by way of example in FIG. 4: elements LS0, LS1 and LS2 for sensing forces applied by the left side of the finger of the individual wearing the device to which the sensor 402 is attached, elements B0, B1, B2 and B3 for sensing forces applied by the bottom of the finger, elements RS0, RS1 and RS2 for sensing forces applied by the right side of the finger, and elements T0 and T1 for forces applied by the fingertip. A single drive element 428 is shown by way of example in FIG. 4. It is noted that the numbers and/or shapes of sense elements and/or drive elements may differ in various embodiments from those indicated in FIG. 4. In the depicted embodiment, the shapes and positions (relative to the fold line 432) of the drive element(s) 428 and the sense elements 425 may be selected such that, after folding and introduction of a dielectric material between the drive element(s) and the sense elements, the drive elements 428 would fit (at least approximately) over the sense elements. As a result, when a force is applied using a part of the finger corresponding to a given sense element in various embodiments, the mutual capacitance between the drive element and the sense element may change, and the magnitude of the change may be interpreted as a measure of the force applied.

In addition to the sense elements 425 and the drive element(s) 428, FIG. 4 also shows a force signal aggregator/transmitter (FSAT) 450 and an inertial measurement unit (IMU) 460 attached to the substrate material. The FSAT 450 and/or the IMU 460 may each comprise one or more integrated circuits in some embodiments. The FSAT 450 may be responsible for receiving indications of the force applied at the different sense elements or segments, and transmitting a representation (e.g., a digitized representation) of the force information to one or more destinations such as an application processing engine in various embodiments. In some embodiments, the term signal aggregator may be used instead of the longer term "force signal aggregator/transmitter". The IMU may detect changes in position, orientation, velocity and the like of the sensor 402 in the depicted embodiment, e.g., as the individual moves the finger for which the sensor is designated. In some embodiments, the inertial measurement data obtained by the IMU 460 may be transmitted to one or more destinations via the FSAT 450; in other embodiments, the IMU 460 may be responsible for transmitting its data. In at least some embodiments, the FSAT 450 and/or the IMU 460 may be physically attached to or mounted on the other side of the substrate material relative to the sense elements 425 and/or the drive elements 428—that is, the FSAT 450 and/or the IMU 460 may not be visible in the view presented in FIG. 4. In some embodiments, multiple FSATs 450 and/or IMUS 460 may be employed.

Figure 5:
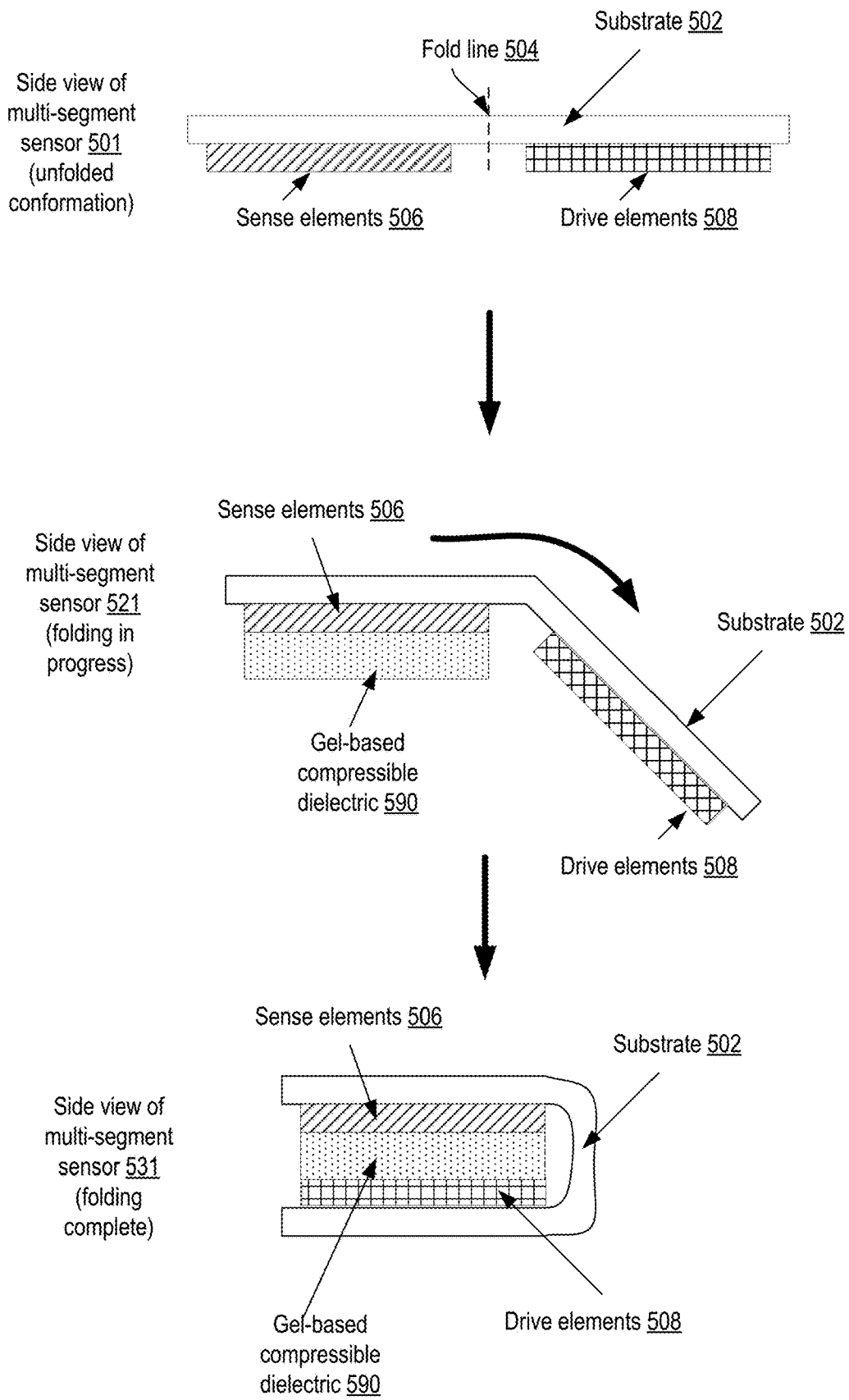
FIG. 5 illustrates an example set of side views of a multi-segment force sensor, including a folded conformation, according to at least some embodiments.

FIG. 5 illustrates an example set of side views of a multi-segment force sensor, including a folded conformation, according to at least some embodiments. The multi-segment sensor is shown in three states with respect to folding—an unfolded conformation 501, a partially-folded or folding-in-progress state 521, and a fully-folded conformation 531.

In the side view of unfolded conformation 501, the fold line 504 is shown separating the two regions of the wearable substrate material 502 to which the sense elements 506 and the drive elements 508 are respectively attached. Prior to completing folding of the sensor, a gel-based compressible dielectric material 590 may be positioned on the sense elements in the depicted embodiment. The size and/or shape of the dielectric material relative to the size and/or shape of the corresponding sense elements may vary in different embodiments; in some embodiments, for example, the contact surface area of the dielectric (not visible in FIG. 5) may be very close to the surface area of a given sense element, while in other embodiments the surface areas may differ. In at least one embodiment a gel dot may be used as the dielectric material (i.e., when viewed head on, the dielectric material used for a given sense element may be roughly circular in shape). In some embodiments, the dielectric material may not comprise a gel.

The sensor may be folded along the fold line in the direction indicated in state 521, so that the drive region eventually makes contact with the dielectric 590. When the folding is complete, as indicated in conformation 531, the sense elements 506 are in contact with the dielectric 590, and the dielectric 590 is in contact with the drive elements 508. When an individual wearing an HWD or other wearable device presses or applies a force in a direction perpendicular to the cross-sectional view shown, e.g., as a result of touching or pushing against a hard or flexible surface, the dielectric material 590 may be compressed. The compression may in turn result in a detectable change in the mutual capacitance in the depicted embodiment, which may be monitored and interpreted as an indication of the magnitude of the applied force.

Figure 6:
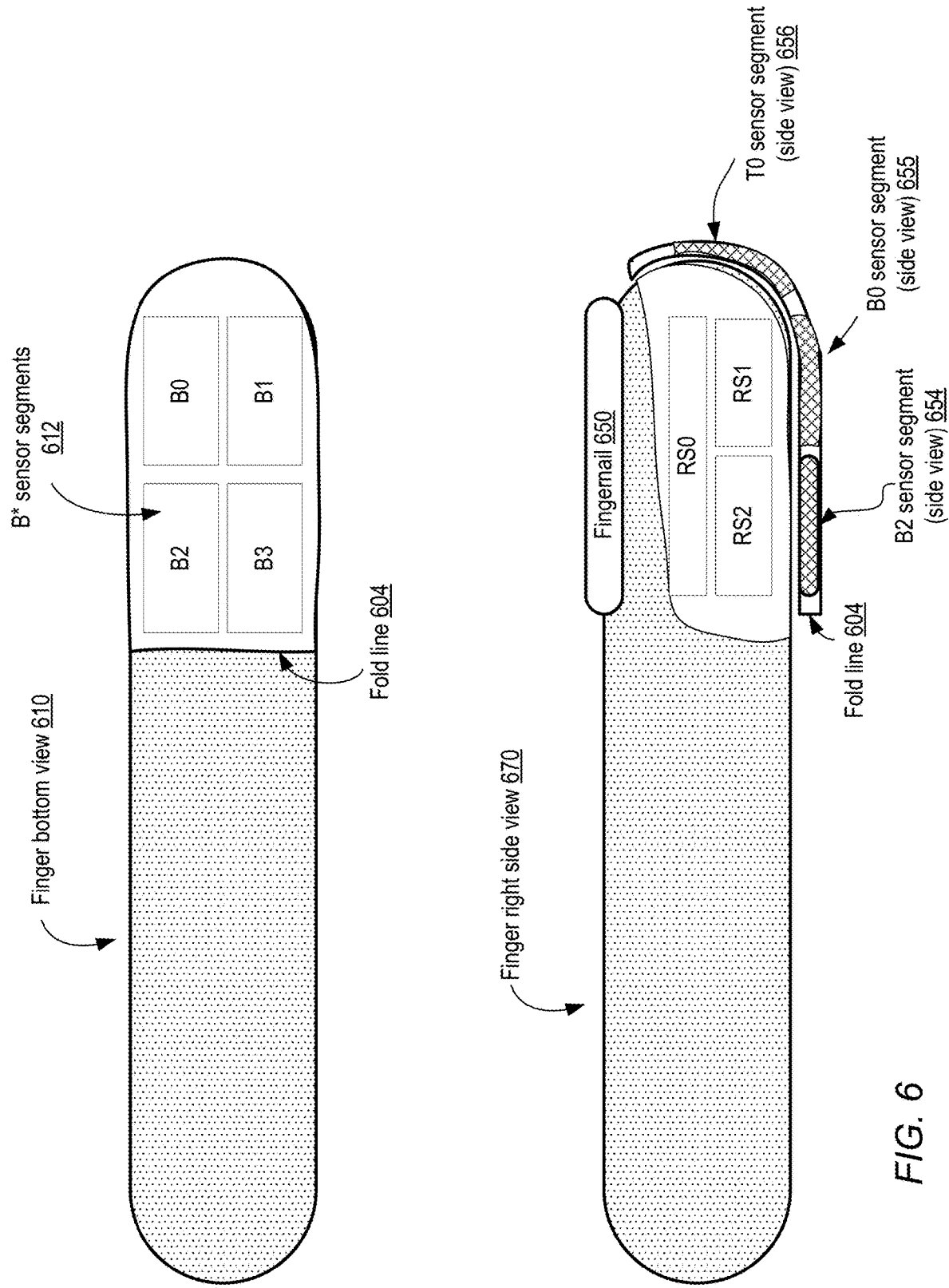
FIG. 6 illustrates a bottom view and a side view of a finger of a hand-wearable device equipped with a multi-segment force sensor, according to at least some embodiments.

FIG. 6 illustrates a bottom view and a side view of a finger of a hand-wearable device equipped with a multi-segment force sensor, according to at least some embodiments. To simplify the presentation, the dielectric material and the drive elements are not shown separately in FIG. 6; instead, only the corresponding sense elements are shown. The twelve-segment architecture discussed earlier is also employed for the multi-segment sensor illustrated in the embodiment depicted in FIG. 6. In the finger bottom view 610, the positioning of the bottom segments of the sensor B0, B1, B2 and B3 in the fully-folded conformation is shown, and the position of the fold line 604 is indicated.

In right side view 670, the position of the fingernail 650 is shown in the depicted embodiment. The position of elements RS0, RS1 and RS2 (visible top-down rather than in cross-section) with respect to the fingernail 650 is indicated. Cross-section views of three additional elements or segments are shown: segment T0 which is folded over the fingertip region, and segments B0 and B2 which are positioned under the finger. It is noted that if the left-side view of the finger were shown, the remaining six segments of the 12-segment configuration would have been visible: LS0, LS1 and LS2 would have been visible top-down as they fold over the left side of the finger, while cross-sectional views of B1, B3, and T1 would have been visible.

Figure 7:
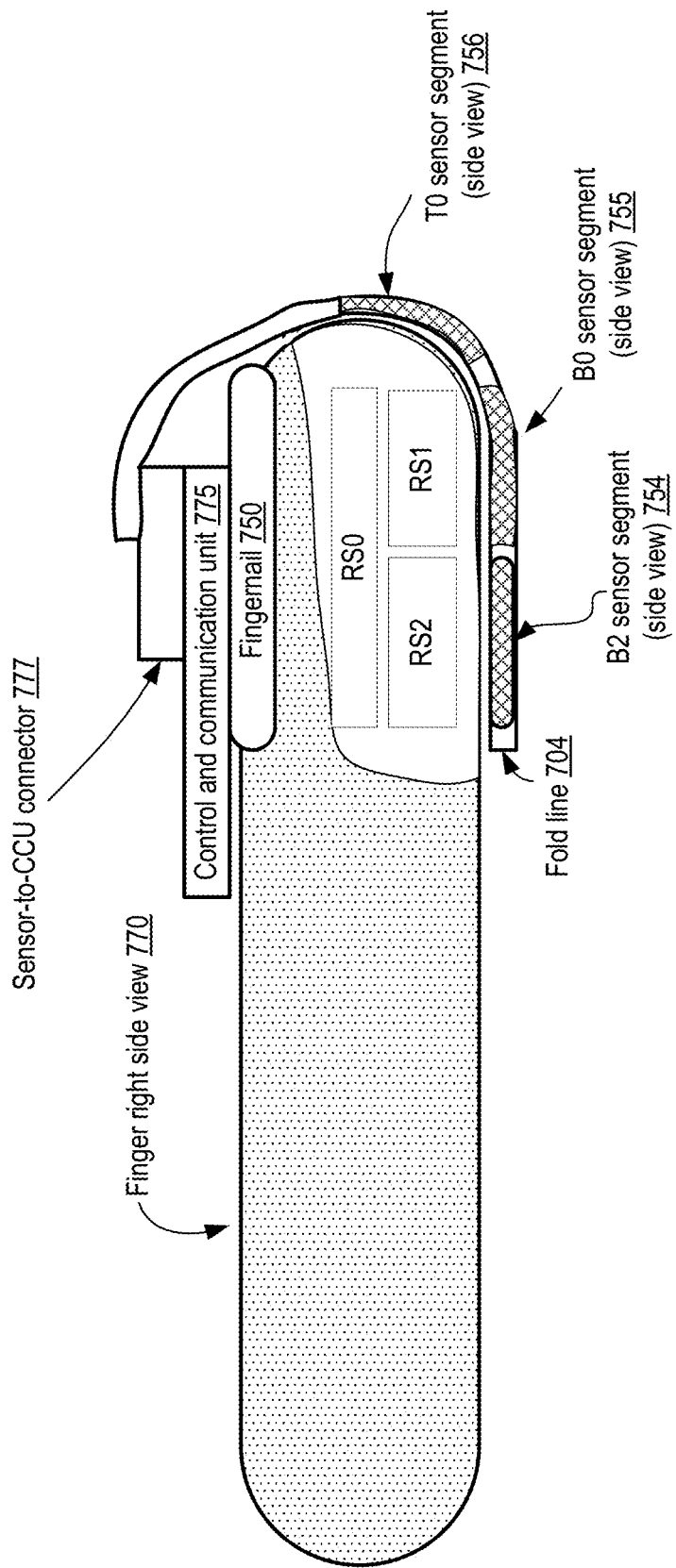
FIG. 7 illustrates an example positioning of a control and communication unit with respect to a multi-segment force sensor for a finger of a hand-wearable device, according to at least some embodiments.

FIG. 7 illustrates an example positioning of a control and communication unit with respect to a multi-segment force sensor for a finger of a hand-wearable device, according to at least some embodiments. Again, a 12-segment configuration is assumed for the multi-segment sensor, similar to that indicated in FIG. 6. As in the side view 670 of FIG. 6, segments RS0, RS1, RS2, B2, B0 and T0 are visible in right side view 770.

In addition, a control and communications unit 775 is shown linked to the multi-segment sensor via a connector 777 in the depicted embodiment. The control and communication unit 775 may be equipped with networking components capable of transmitting the representations of force obtained from the sensor via connector 777 to one or more destinations (such as a processing engine) in the depicted embodiment. In some embodiments in which the multi-segment sensor comprises a force signal aggregator/transmitter (similar to FSAT 450 shown in FIG. 4) and/or one or more IMUs (inertial measurement units) similar to IMU 460 of FIG. 4, the control and communication unit 775 may act as an intermediary between the FSATs/IMUs and the processing engines to which the representations of force/position are transmitted. In other embodiments, separate control and communication units may not be required. In some embodiments, the control and communication unit 775 may serve as a signal aggregator—e.g., it may collect signals output by the individual segments of one or more of the multi-segment sensors and transmit representations of the signals to one or more destinations, and FSATs may not be required on the individual multi-segment sensors themselves.

Figure 8:
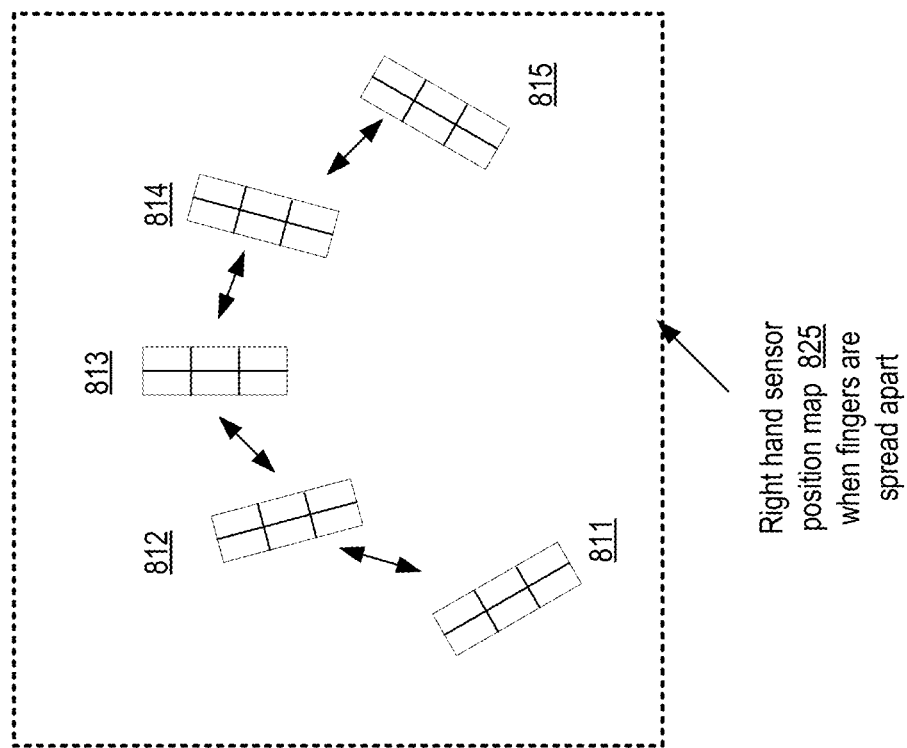
FIG. 8 illustrates an example scenario in which information about the motion of fingers relative to one another may be captured based on the positions of the multi-segment force sensors, according to at least some embodiments.
Figure 8:
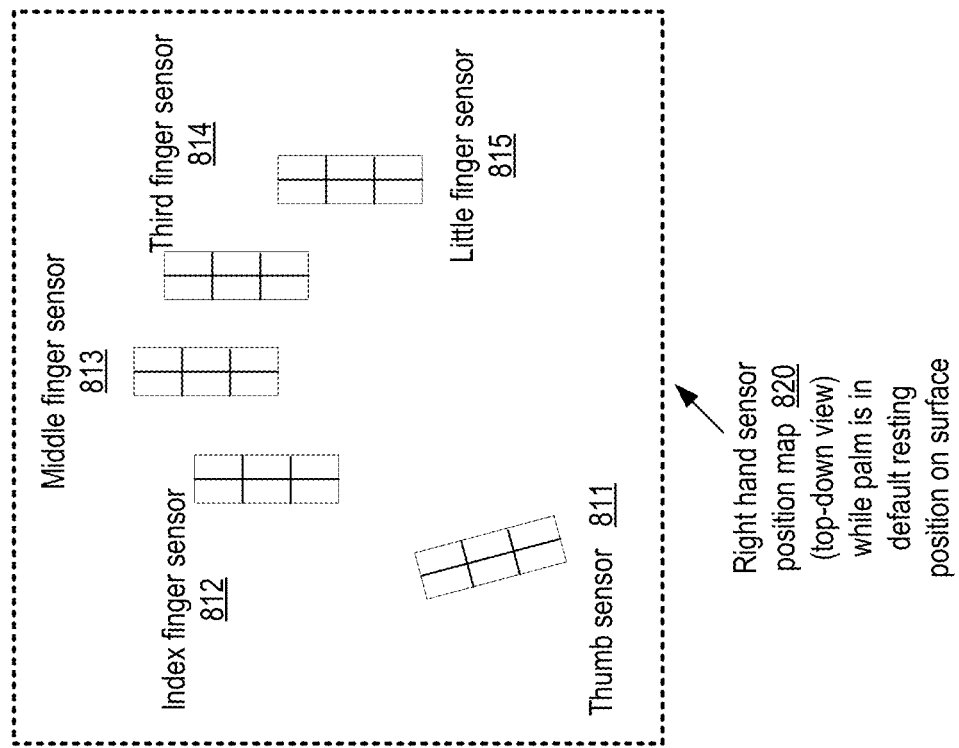

As mentioned above, inertial measurement units (IMUs) may be incorporated within or deployed together with multi-segment force sensors in various embodiments. FIG. 8 illustrates an example scenario in which information about the motion of fingers relative to one another may be captured based on the positions of the multi-segment force sensors, according to at least some embodiments. In sensor position map 820 of FIG. 8, a top-down view of the relative positions of five multi-segment force sensors of the right hand of an HWD are shown, at a time when the hand is in a default or resting position on some surface. The force sensors whose positions are indicated include thumb sensor 811, index finger sensor 812, middle finger sensor 813, third finger sensor 814, and little finger sensor 815. Each of the individual sensors for the five digits respectively comprises a group of sensor segments indicated schematically by six small rectangles arranged in a 3×2 array in the depicted embodiment. The map 820 may be generated, for example, at an application processing engine in various embodiments, and may be updated dynamically as new sets of signals are received at the application processing engine.

If the individual wearing the HWD whose sensor positions are shown in map 820 spreads their right hand's fingers apart, the sensor position map 825 may be generated as data from the IMUS or other position sensors are obtained. The combination of force distribution information (e.g., how much force is being applied at each of the segments of each of the sensors 811-815) with position/motion information may enable various types of touch-based gestures to be detected and interpreted in various embodiments. For example, if the fingertip sensor segments (e.g., segments labeled T0 or T1) of a thumb sensor 811 and an index finger sensor 812 are close together at one point in time, and move apart soon thereafter, this may be interpreted as the equivalent of a multi-touch signal to expand or zoom in on some object in some embodiments.

Figure 9:
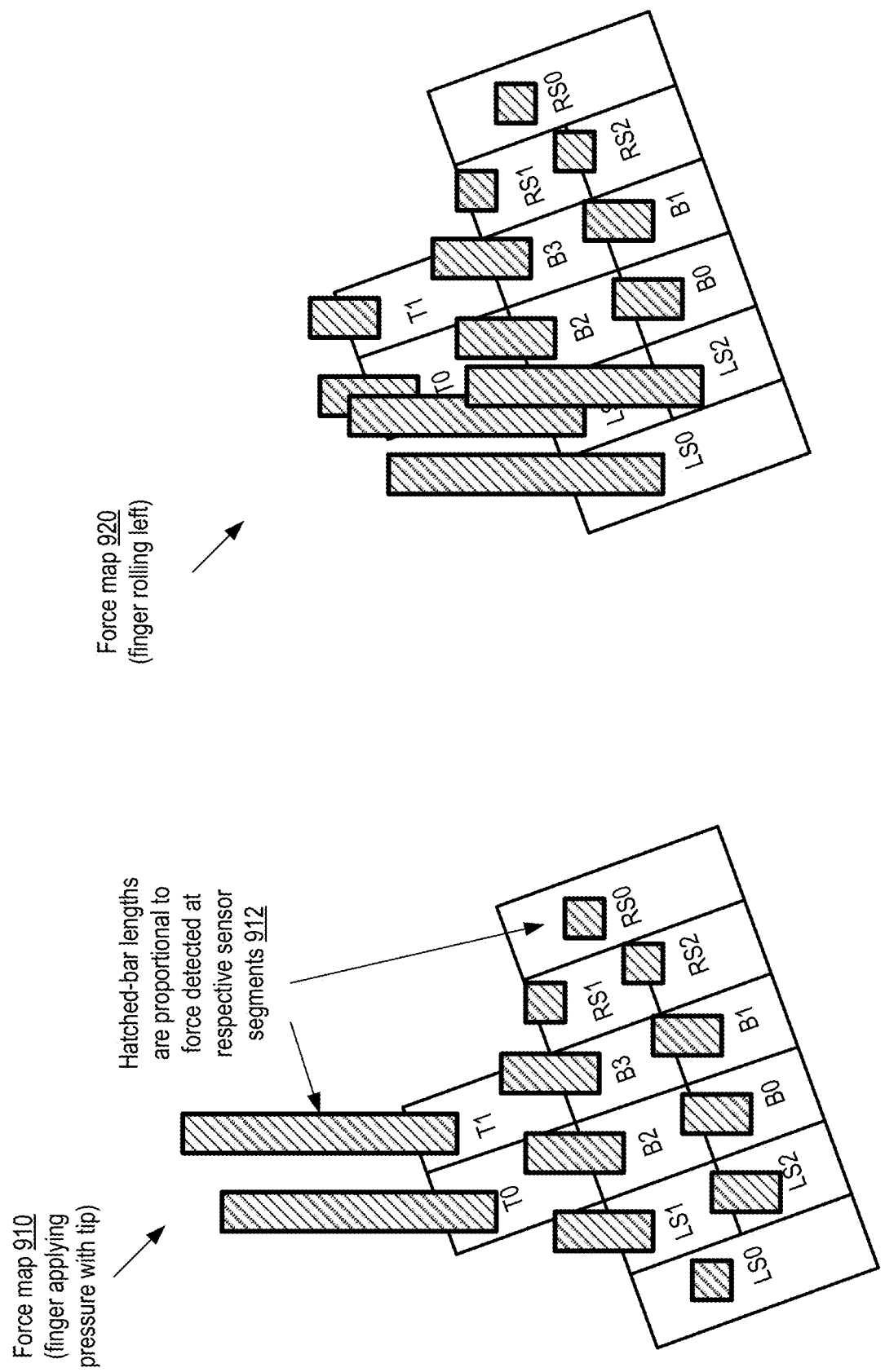
FIG. 9 illustrates example force maps which may be generated by combining information from a plurality of multi-segment force sensors, according to at least some embodiments.

FIG. 9 illustrates example force maps which may be generated by combining information from a plurality of multi-segment force sensors, according to at least some embodiments. A force map may provide a visual representation of the spatial and/or temporal distribution of forces applied to the various segments of one or more multi-segment force sensors in the depicted embodiment. With respect to each segment of a particular multi-segment force sensor, a respective hatched bar is shown in force maps 910 and 920, with the height of each bar proportional to the magnitude of the force applied to the corresponding sensor segment at a particular point in time as indicated by label 912. Respective bars are shown for each of twelve segments of a sensor similar to the sensor segments discussed earlier—segments with labels T0 and T1 for fingertips, labels starting with LS for the left side of the finger, and so on. Force maps 910 and/or 920 may be generated at an application processing engine in the depicted embodiment based on data received from the sensor, e.g., in real time with respect to the times at which the forces are applied. All the bars shown in a particular map may represent the same point in time (or some short time interval) in at least some embodiments.

In force map 910, the greater heights of the hatched bars corresponding to fingertip sensors T0 and T1, relative to the smaller heights of the hatched bars corresponding to other fingertip sensors, may indicate that the individual wearing the sensor-equipped device is applying pressure against some surface using their fingertip. Such a force map may be generated, for example, each time the finger is used to strike a key of a virtual keyboard being projected onto some surface. In force map 920, the heights of the bars corresponding to the left side segments LS0, LF1 and LS2 are much higher than those of other segments, indicating that the finger is being rolled to the left (as may happen when the individual rotates their wrist anti-clockwise, for example).

In FIG. 9, for simplicity, two-dimensional bars are shown as force magnitude indicators. In other embodiments, three-dimensional bars and/or other shapes may be used. In some embodiments, color coding may be used to indicate the magnitude of the forces, e.g., in addition to or instead of using the heights of the bars—for example, the color red may be used to indicate a large magnitude, yellow a medium magnitude, and green a low magnitude. In various embodiments, the changes in force distribution over time may be visualized in video form—e.g., the maps may be updated continuously or near-continuously. Force maps may be used to provide an intuitive understanding of the force distributions in some embodiments, or to debug the tools used for analysis, while the analysis and interpretation of the force distributions may be performed regardless of whether the visualizations are provided or not.

Figure 10:
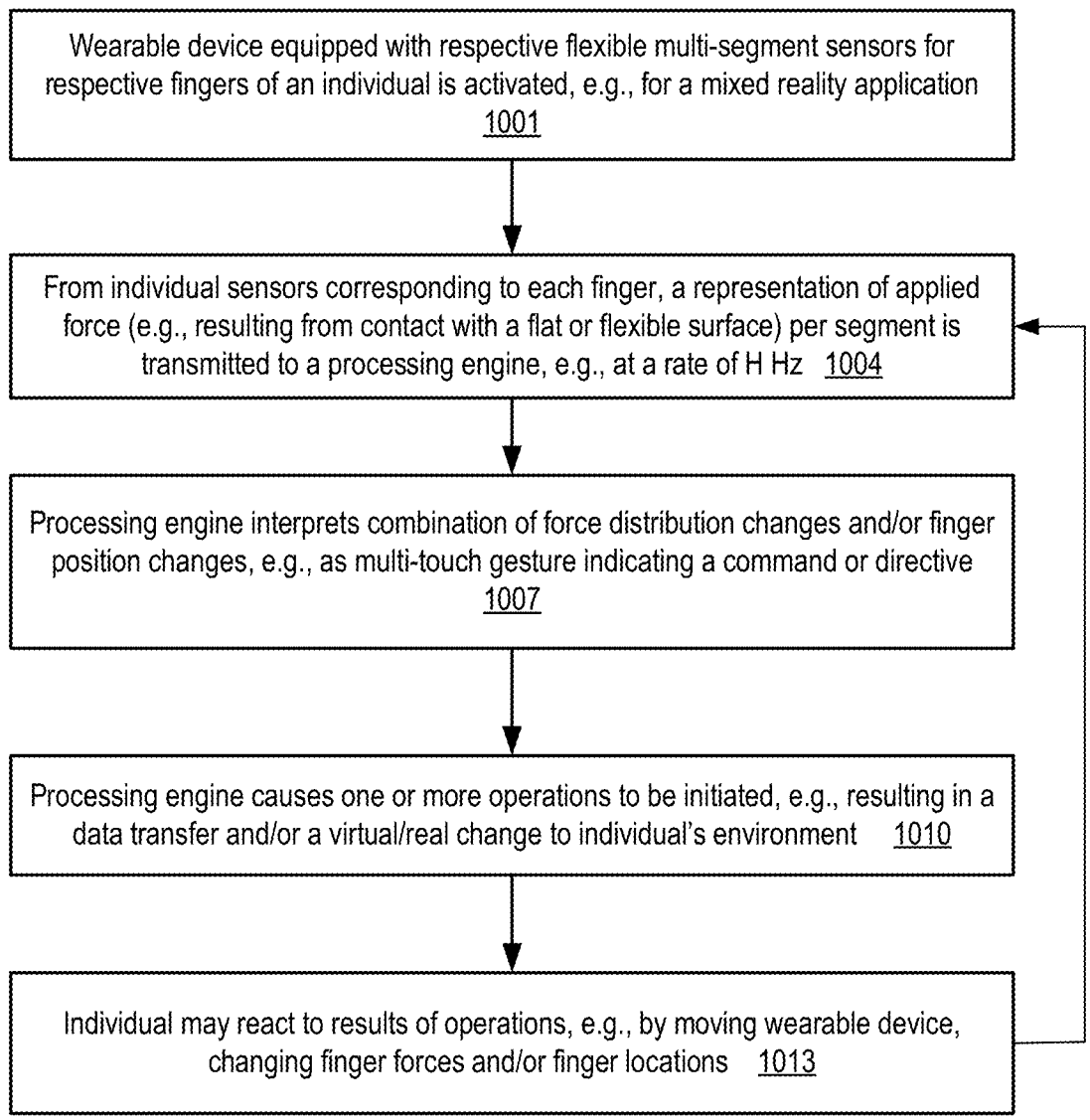
FIG. 10 is a flow diagram illustrating aspects of operations which may be performed to capture applied force distribution information from a wearable device, according to at least some embodiments.

FIG. 10 is a flow diagram illustrating aspects of operations which may be performed to capture applied force distribution information from a wearable device, according to at least some embodiments. As shown in element 1001, a wearable device (such as a glove) equipped with respective multi-segment force sensors for a plurality of fingers may be activated to start measuring applied forces, e.g., as part of an initialization phase of a mixed-reality application or system in the depicted embodiment. In some embodiments, the wearable device may also include multi-segment sensors which are not located strictly on the fingers or thumbs as such, but may be located for example at various positions on the palm, wrist and so on. In at least some embodiments, multi-segment sensors may be located on other body parts (such as the feet), in addition to or instead of being located on the hands. In at least some embodiments, mutual capacitance sensors with a gel electrolyte layer sandwiched between the drive element(s) and sense elements may be used for the multi-segment sensors.

From individual sensors corresponding to each finger, a representation of applied force (e.g., resulting from contact with a flat or flexible surface) per segment may be transmitted to a processing engine for the application, e.g., at some selected rate of H Hz in the depicted embodiment (element 1004). In various embodiments, the signals generated at the individual segments over some period of time may be aggregated at one or more intermediary devices prior to being sent to the processing engine. For example, in one embodiment, a respective force signal aggregator/transmitter comprising some set of circuitry may be incorporated within or attached to each multi-segment sensor. In some embodiments a control/communication unit coupled to one or more of the sensors may be responsible for transmitting the data to the processing engine. A combination of per-sensor aggregators and global control/communication units may be used in at least one embodiment. In some embodiments, in addition to transmitting indications of force distribution (e.g., spatial or temporal distributions) to the processing engine, the wearable device may also provide data about the positions and/or movements of the sensors relative to one another. Such data may, for example, be obtained from one or more inertial measurement units of the wearable device. In at least some embodiments, individual ones of the multi-segment force sensors may provide (as a result of the presence of the multiple segments) force distribution information at one granularity (such as intra-finger granularity), the combination of information from multiple multi-segment sensors (attached to different fingers of a given hand) may provide force distribution information at a second level of granularity, while the combination of information from multiple body extremities (both hands and/or feet) may provide force distribution information at a third level of granularity.

The processing engine may analyze the data provided by the wearable device in various embodiments (element 1007), e.g., at one or more of the levels of granularity indicated above. In some embodiments, at least a subset of the received data may be interpreted as a command or directive to be implemented. Using the combination of position/movement information and applied force information, in one embodiment multi-touch gestures made by the individual may be detected. A determination may be made that the forces were applied to portions of a virtual object (such as a virtual keyboard) projected onto a real or physical surface in some embodiments, and the particular portions of the virtual object to which the forces were applied (e.g., the particular keys of the virtual keyboard) may be identified in order to interpret the behavior of the individual.

The processing engine may cause one or more operations to be initiated based on the analysis of the information received from the wearable device in some embodiments (element 1010). The operations, whose specifics may depend on the application for which the wearable device is being used, may for example result in a data transfer back to one or more physical component implementing the application (such as a head mounted device or a sensor-equipped hand-wearable device). In some embodiments, the operations initiated as a result of the analysis of the force and/or positional information may result in a virtual or real change to the environment of the individual wearing the device. The individual may react to the results of the operations, e.g., by moving portions of the wearable device, changing the applied forces or the positions of the fingers, and so on (element 1013). Such changes may be captured using the multi-segment sensors, and another iteration of operations corresponding to elements 1004-1013 may be performed in the depicted embodiment. The iterations may continue until the wearable device is de-activated in at least some embodiments.

It is noted that in various embodiments, at least some operations other than those illustrated in the flow diagram of FIG. 10 may be performed to implement the segmented force detection and analysis techniques described above. Some of the operations shown may not be implemented in some embodiments or may be implemented in a different order, or in parallel rather than sequentially.

Figure 11:
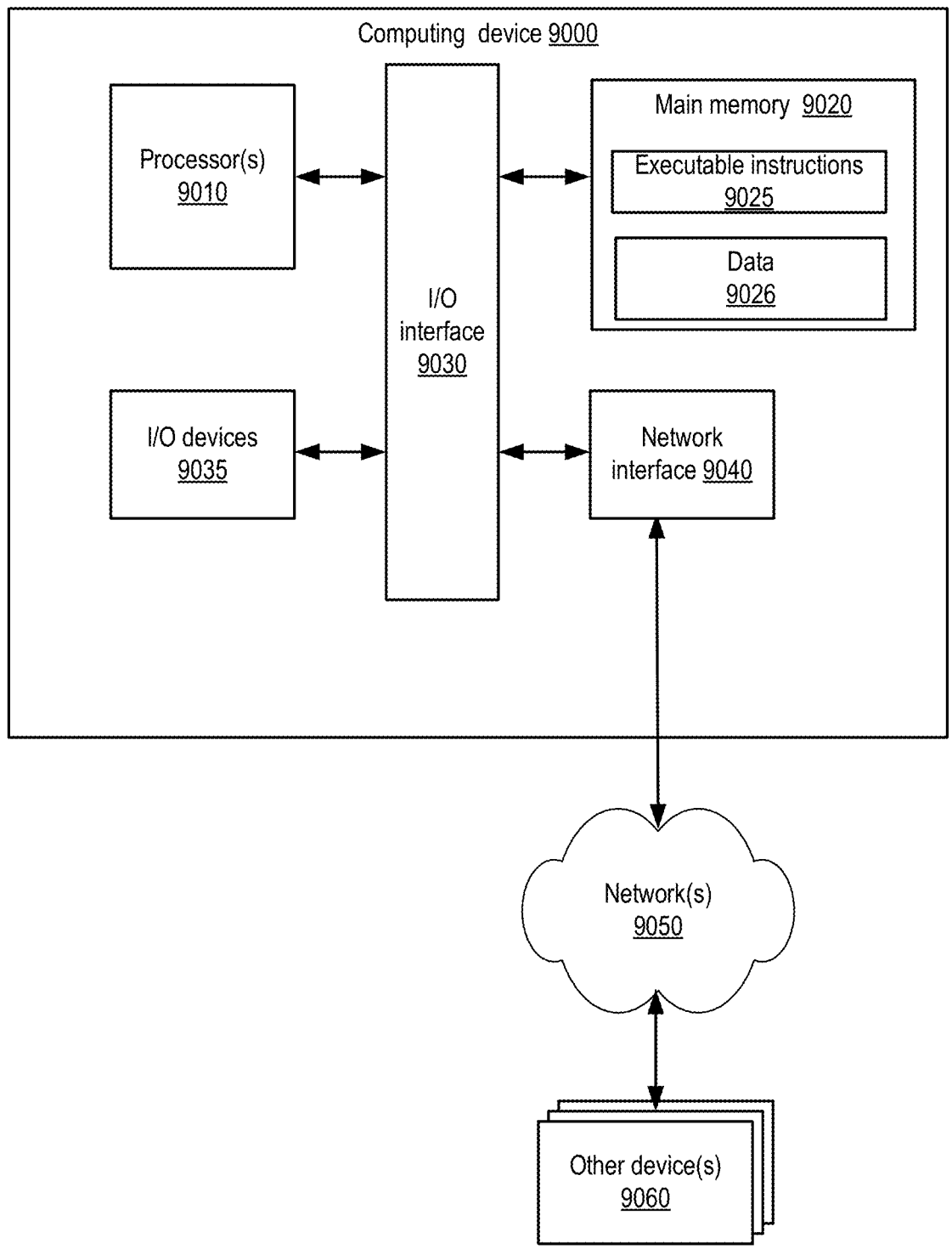
FIG. 11 is a block diagram illustrating an example computing device that may be used in at least some embodiments.

In at least some embodiments, a server that implements a portion or all of one or more of the force detection and analysis techniques described herein, including the techniques to collect and interpret force and positional data obtained from multi-segment force sensors, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a sensor-equipped wearable device; and
    a processing engine comprising one or more processors and a memory;
    wherein the memory comprises program instructions that when executed on the one or more processors cause the one or more processors to implement a method comprising:
        obtaining, from a first multi-segment sensor of a first finger of the sensor-equipped wearable device, an indication of a first distribution of force applied by the first finger of an individual during a particular time interval, wherein the first multi-segment sensor comprises at least a first segment positioned at a tip of the first finger and a second segment positioned along a palm-side surface of the first finger of the individual's hand;
        obtaining, from a second multi-segment sensor of a second finger of the sensor-equipped wearable device for the individual's hand, an indication of a second distribution of force applied by the second finger of the individual during the particular time interval;
        based at least on an analysis of individual ones of the first distribution of force applied by the first finger and the second distribution of force applied by the second finger, detect a command to be implemented; and causing initiation of an operation which implements the command.

2. The system as recited in claim 1, wherein the first segment comprises a mutual capacitive sensor, a strain gauge, a force sensitive resistor, or an inductive sensor.

3. The system as recited in claim 1, wherein the one or more operations comprise an operation of a mixed-reality application.

4. The system as recited in claim 1, wherein said analysis of the first distribution and the second distribution comprises detecting a multi-touch gesture made by the individual using at least the first and second fingers.

5. The system as recited in claim 4, wherein the first distribution of force comprises a force resulting from contact with a surface onto which a virtual object is projected.

6. The system as recited in claim 5, wherein the virtual object comprises a virtual keyboard, a virtual trackpad, a virtual mouse, or a virtual button.

7. The system as recited in claim 1, wherein the sensor-equipped wearable device comprises:
a signal aggregator;
wherein the first segment and the second segment are connected to a flexible substrate material, wherein a first portion of the flexible substrate material and a second portion of the flexible substrate material are configured to collectively wrap at least partially around a portion of the individual's hand, wherein the first segment is attached to the first portion, and wherein the second segment is attached to the second portion;
wherein the signal aggregator:
receives, from one or more segments of the first multi-segment sensor, respective signals indicative of forces applied by the individual to the segments; and
causes a representation of the respective signals to be transmitted to the processing engine.

8. The system as recited in claim 7, wherein the portion of the individual's hand comprises the first finger.

9. The system as recited in claim 7, wherein the first segment:
transmits, to the signal aggregator, a signal indicative of a force applied by the tip of the first finger of the individual; and
wherein the second segment transmits, to the signal aggregator, a signal indicative of a force applied by a ventral surface of the first finger.

10. The system as recited in claim 7, wherein the first segment comprises a mutual capacitive sensor.

11. The system as recited in claim 10, wherein the mutual capacitive sensor comprises a gel-based dielectric layer.

12. The system as recited in claim 7, wherein the flexible substrate material is in a folded conformation, and wherein the flexible substrate material comprises a fold boundary separating one or more drive electrode elements of the first multi-segment sensor from a plurality of sense electrode elements, wherein individual ones of the sense electrode elements correspond to individual ones of the segments.

13. The system as recited in claim 7, further comprising one or more inertial measurement units, wherein the one or more inertial measurement units are configured to:
cause an indication of a change of position or orientation of the first finger to be transmitted to a destination.

14. The system as recited in claim 7, wherein the processing engine executes a mixed-reality application.

15. The system as recited in claim 7, wherein the surface area of the first segment differs from the surface area of the second segment.

16. A method, comprising:
performing, by a processing engine comprising one or more processors and a memory:
obtaining, from a first multi-segment sensor of a first finger of a sensor-equipped wearable device, an indication of a first distribution of force applied by the first finger of an individual during a particular time interval, wherein the first multi-segment sensor comprises at least a first segment positioned at a tip of the first finger and a second segment positioned along a palm-side surface of the first finger;
obtaining, from a second multi-segment sensor of a second finger of the sensor-equipped wearable device for the individual's hand, an indication of a second distribution of force applied by the second finger of the individual during the particular time interval;
based at least on an analysis of individual ones of the first distribution of force applied by the first finger and the second distribution of force applied by the second finger, detect a command to be implemented; and
causing initiation of an operation which implements the command.

17. The method as recited in claim 16, wherein the first distribution of force is a result of contact between the first finger and a flexible surface.

18. The method as recited in claim 16, wherein the method comprises:
obtaining, from one or more optical sensors, a data set representing at least a portion of a visible environment of the individual, wherein the command is determined based at least on an analysis of the data set.

19. The method as recited in claim 18, wherein the portion of the visible environment does not include a view of at least a portion of the sensor-equipped wearable device.

20. The method as recited in claim 16, further comprising:
determining, based at least on an analysis of the first distribution of force, and based at least on a position of the first finger, the command on behalf of the individual.

* * * * *